United States Patent [19]

Lemaire et al.

[11] 4,449,624

[45] May 22, 1984

[54] DEVICE FOR CONVEYING AND REDISTRIBUTING OBJECTS

[75] Inventors: Didier Lemaire, Cherisy-Vernouillet; Gérard Lebret, Saint Lubin des Joncherets, both of France

[73] Assignee: E. P. Remy et Cie, Dreux, France

[21] Appl. No.: 321,543

[22] Filed: Nov. 16, 1981

[30] Foreign Application Priority Data

Dec. 19, 1980 [FR] France ................................. 80 27117

[51] Int. Cl.³ ............................................. B65G 47/24
[52] U.S. Cl. ..................................... 198/412; 198/440
[58] Field of Search ............... 198/440, 442, 454, 426, 198/436, 462, 453, 604, 717, 456, 412; 414/62, 57, 902

[56] References Cited

U.S. PATENT DOCUMENTS

| 2,247,673 | 7/1941 | Thum ............................. 198/452 X |
| 3,085,696 | 4/1963 | Stainforth et al. ..................... 414/62 |
| 3,294,257 | 12/1966 | Davies et al. ......................... 414/62 |
| 3,442,400 | 5/1969 | Roth et al. ....................... 414/62 X |
| 3,482,674 | 12/1969 | Wiseman ............................. 198/34 |
| 3,627,103 | 12/1971 | Leach ............................. 198/33 AB |
| 3,638,792 | 2/1972 | Bilocq ............................... 198/456 |
| 4,026,422 | 5/1977 | Leenaards .......................... 414/62 X |
| 4,319,676 | 3/1982 | Turnbough ....................... 198/454 X |

FOREIGN PATENT DOCUMENTS

| 1243532 | 9/1959 | France ................................. 198/462 |
| 2197771 | 3/1974 | France .. |
| 2258326 | 8/1975 | France . |
| 617150 | 5/1980 | Switzerland . |
| 964411 | 7/1964 | United Kingdom .................. 414/57 |

Primary Examiner—Joseph E. Valenza
Assistant Examiner—Kyle E. Shane
Attorney, Agent, or Firm—Kenyon & Kenyon

[57] ABSTRACT

The invention relates to a device for continuously distributing parallelepipedic loads which comprises a conveyor constituted by power-driven rollers whose axis is perpendicular to that of the push-bars of an endless chain conveyor arranged above the rollers, whereas an element for guiding the objects driven simultaneously by the rollers and the push-bars is arranged obliquely between the roller conveyor and the push-bar conveyor, the push-bars being provided with stops for transverse positioning of the objects on the roller conveyor.

7 Claims, 6 Drawing Figures

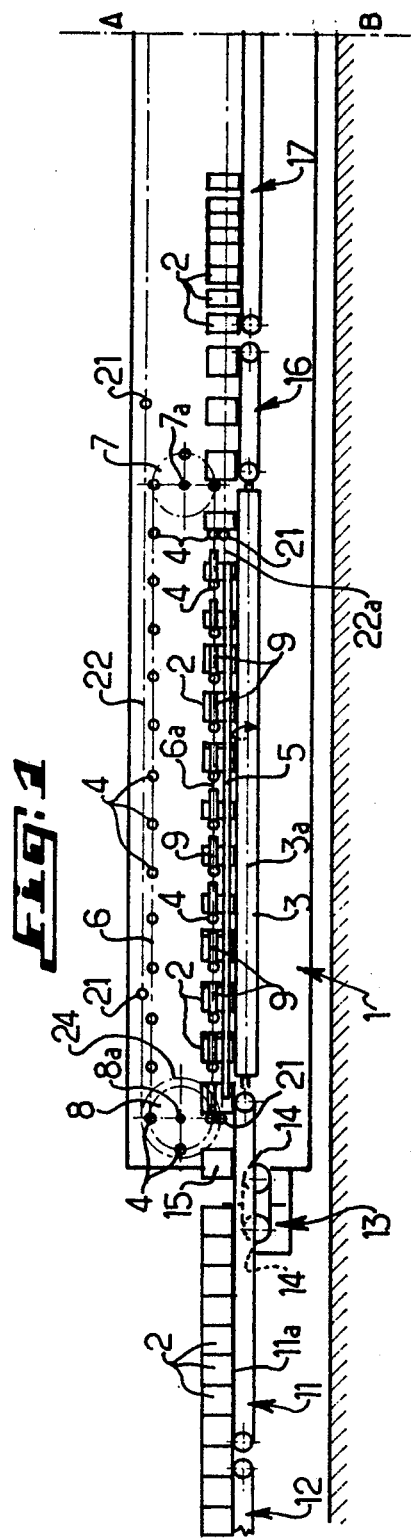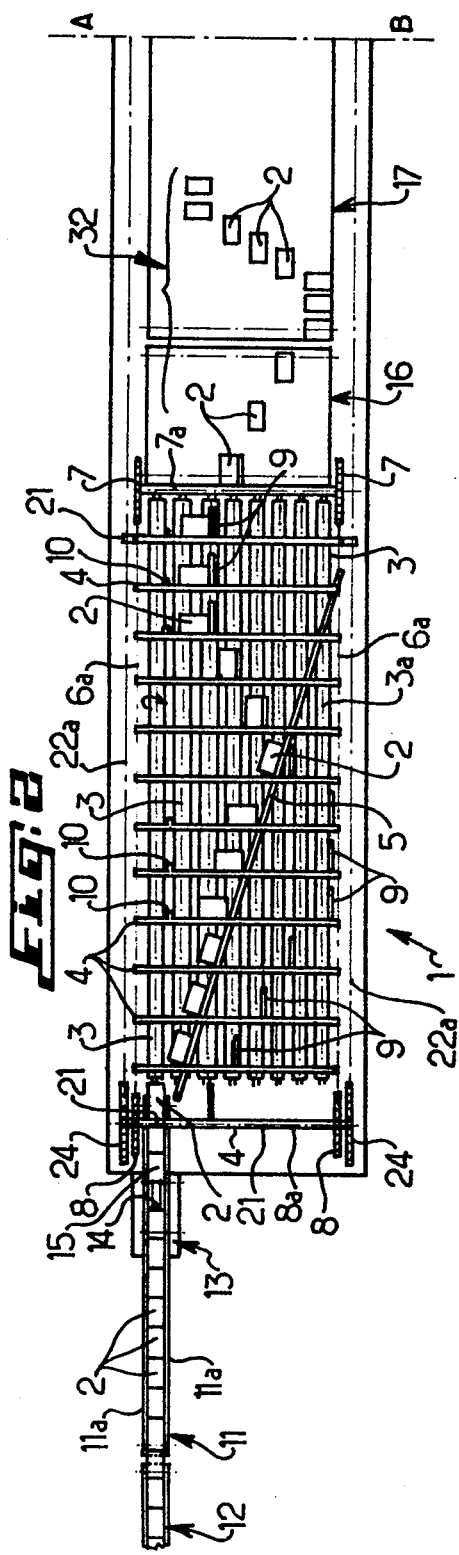

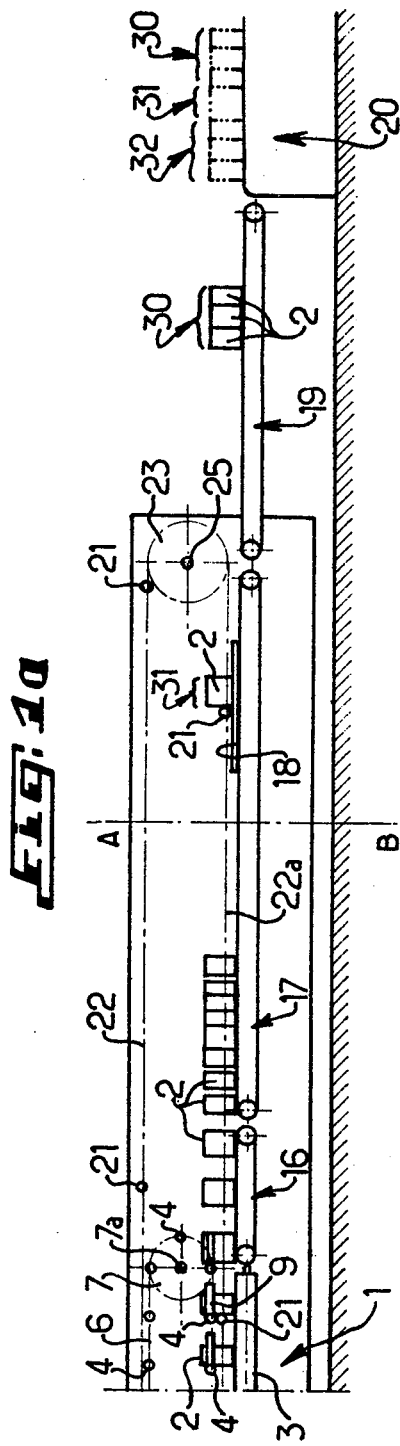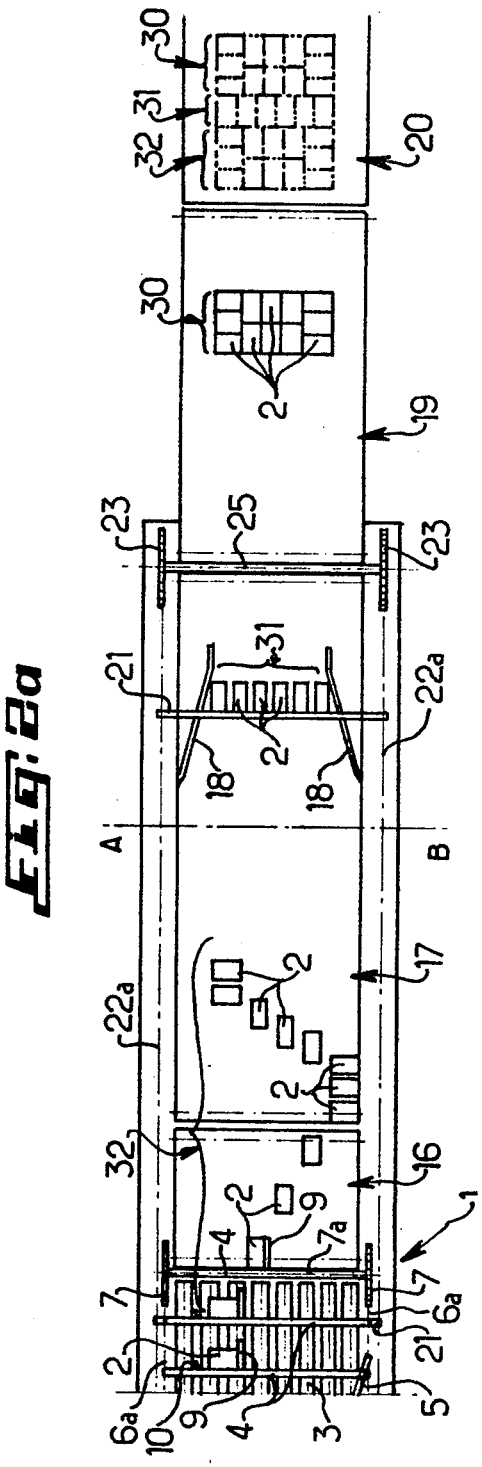

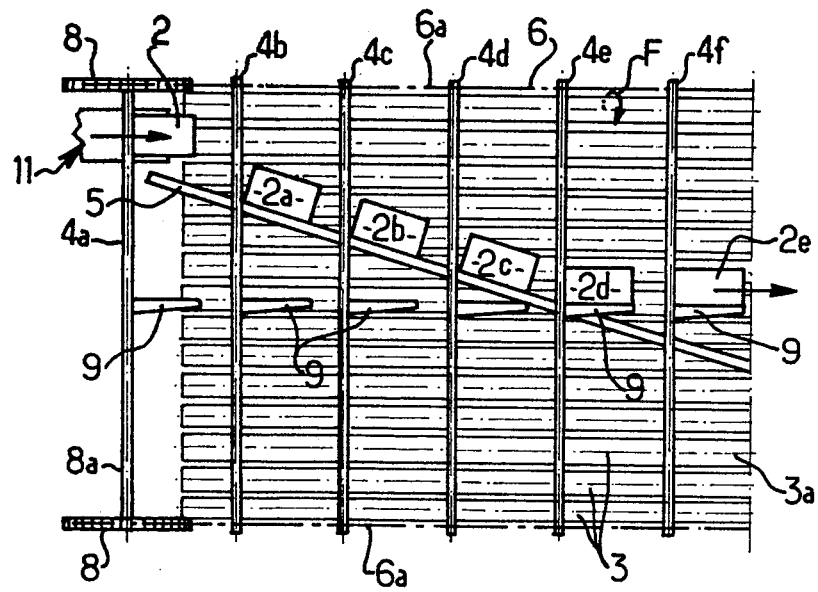
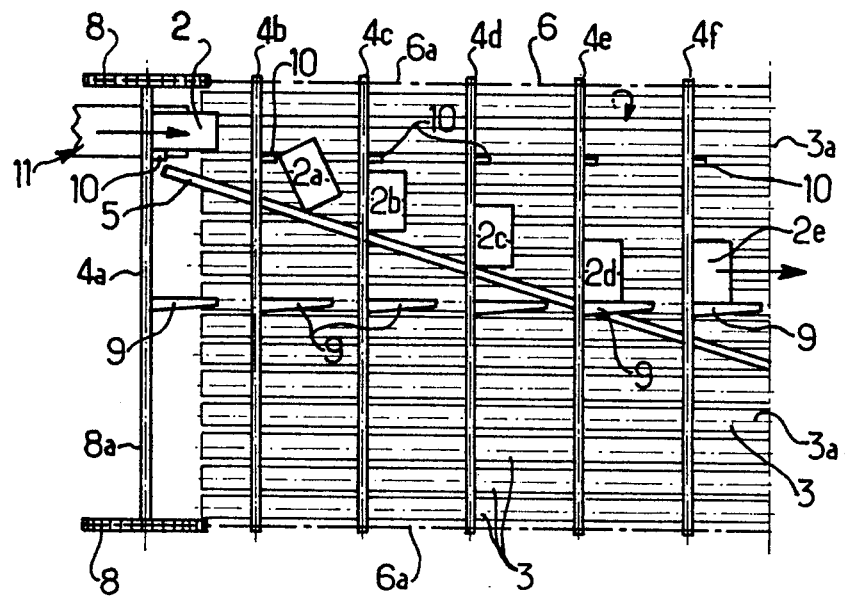

DEVICE FOR CONVEYING AND REDISTRIBUTING OBJECTS

The present invention has essentially for a subject matter a device for distributing continuously any objects or loads on a conveyor with a view to their possible subsequent regrouping.

More precisely, the invention provides a device which allows orienting and distributing into a predetermined arrangement any parallelepipedic loads such as boxes, racks or packs capable of containing various articles, in such a manner that after orienting and distributing the said loads it is possible to regroup them so that they form a compact set of suitable shape allowing them to be placed in successive layers for example on a pallet with a view to ensuring their rational transfer.

There had not hitherto been proposed a reliable and automatic device for orienting and distributing parallelepipedic loads, which could by itself ensure the handling and re-orientation of the said loads without any manual intervention and in such a manner as to achieve a regrouping of the loads into a predetermined pattern suitable for example for transferring or subjecting to any subsequent treatment the set of regrouped loads.

The purpose of the present invention is to fill in this gap by providing a device capable of perfectly fulfilling all the above functions.

To this end, the invention provides a device for distributing continuously any objects or loads on a conveyor with a view to their possible subsequent regrouping, the said objects being for example substantially parallelepipedic in shape and being conveyed on a conveyor supporting the loads and above which is arranged an endless chain conveyor provided with bars for pushing the loads on the said supporting conveyor, characterized in that the said supporting conveyor is constituted by power-driven rollers or the like whose axes are substantially perpendicular to that of the bars of the endless chain conveyor, whereas an element for guiding the objects driven simultaneously by the rollers and the bars is arranged obliquely between the supporting roller conveyor and the endless chain conveyor, the said bars being provided with means for transverse positioning of the objects on the said supporting conveyor.

Thus, the driving of the parallelepipedic loads is ensured by the combined orthogonal movements of the rollers and the bars, in such a manner that they meet the oblique guiding element and the means for transverse positioning of the loads on the supporting conveyor, thus ensuring their orientation and their distribution on the latter.

According to another characterizing feature of the invention, each said bar is provided with a stop for retaining and translating the loads possibly with a stop for rotating the latter.

According to another characterizing feature of the invention, there is provided downstream of the said supporting roller conveyor and the said push-bar conveyor at least one conveyor for discharging and/or longitudinal and/or transverse regrouping of the previously distributed objects.

According to another characterizing feature, there is provided above the said discharging and/or regrouping conveyor a second endless chain conveyor provided with push-bars coupled to the one mentioned in the first place, in such a manner that above the said roller conveyor each bar of the lower side of the second push-bar conveyor is located right below a bar of the lower side of the first push-bar conveyor.

Thus, the first push-bar conveyor serves to distribute the objects on the roller conveyor, whereas the second push-bar conveyor participates in the discharge and regrouping of the objects previously distributed.

According to still another characterizing feature of the invention, there is arranged above the said discharging and/or regrouping conveyor a set of lateral guides ensuring the regrouping of the objects in the transverse direction.

According to a preferred form of embodiment, upstream of the said roller conveyor is provided at least one conveyor for conveying in a line the objects to be distributed and at least one means for separating from the said line engaging and delivering one by one the said objects, whereas downstream of the roller conveyor are provided successively a conveyor for discharging the previously distributed objects, a conveyor for regrouping the said objects in the longitudinal and transverse directions, and another conveyor for discharging the previously regrouped objects.

Other characterizing features and advantages of the machine according to the invention will appear more clearly from the following detailed description with reference to the appended drawings given solely by way of example and wherein:

FIGS. 1 and 1a are diagrammatic elevational views of a machine for distributing and regrouping objects according to the invention, FIG. 1a being a continuation of FIG. 1 along the line A-B;

FIGS. 2 and 2a are top views of the machine of FIGS. 1 and 1a, respectively, showing how the distribution and regrouping of the objects on the machine is effected;

FIG. 3 is a partial diagrammatic top view of the distributing conveyor proper, showing the successive positions of an object deviated transversely on the said conveyor; and FIG. 4 is a view identical with that of FIG. 3, but showing the successive positions of an object which is not only deviated transversely but also re-orientated.

Referring more particularly to FIGS. 1 and 2, it is seen that a machine according to the invention comprises essentially a device 1 for distributing continuously parallelepipedic objects 2, which device is constituted by a load-supporting power-driven roller conveyor 3 above which is provided an endless chain conveyor provided with push-bars 4.

As seen clearly in FIGS. 2 to 4, the axes 3a of the power-driven rollers 3 are substantially perpendicular to the axis of the bars 4.

An element 5 for guiding the objects 2 driven simultaneously by the rollers 3 and by the bars 4 is arranged obliquely between the push-bar conveyor 4 and the roller conveyor 3. The push-bar conveyor 4 is, as illustrated diagrammatically, constituted by two endless chains 6 passing round two pairs of sprockets 7 and 8 keyed to shafts 7a, and 8a, respectively. The bars 4, as seen clearly in FIGS. 2 and 4, extend transversely to and are jointly movable with the chains 6.

The bars 4 are provided each with a relatively long stop 9 perpendicular to the bars 4 and capable of retaining the objects 2. The bars 4 may also be provided with a relatively short stop 10 capable of rotating the objects or loads 2 in order to reorient them, as seen more clearly in FIG. 4. However, it will be noted here that the object rotating stop 10 may be omitted on some bar 4 or other.

The presence or the absence of the stop 10 depends on the position of the object or objects 2 which it is desired to reorient in the line of objects arriving on the roller conveyor 3. There is thus seen, in FIG. 3, a bar 4 illustrated in six successive positions designated at 4a, 4b, 4c, 4d, 4e and 4f, respectively, and provided only with a stop 9 for retaining the objects 2, whereas the bar in FIG. 4 illustrated in the six successive positions 4a to 4f is provided with a stop 9 and also with a stop 10 for orienting the parallelepipedic objects 2.

According to a preferred form of embodiment, the objects to be distributed on the roller conveyor 3 are conveyed towards the latter in a line by means of an intake conveyor 11 possibly preceded by a feeding conveyor 12. Between the chains 11a of the intake conveyor 11 is provided a selection conveyor or device 13 with fingers 14 adapted to engage the line of objects 2 to deliver them one by one onto the roller conveyor 3 as seen clearly at 15 in FIGS. 1 and 2.

Downstream of the roller conveyor 3 and of the push-bar conveyor 4 are successively provided : a conveyor 16 for discharging the objects 2 previously distributed, a conveyor 17 for regrouping the said objects in the longitudinal direction, and also in the transverse direction by means of a set of lateral guides 18 seen in FIGS. 1a and 2a, and another conveyor 19 for discharging the previously regrouped objects. Lastly, there is diagrammatically shown at 20 a support for the group of objects formed by the machine according to the invention, and which may be for example a pallet capable of receiving and transferring several successive layers of regrouped objects.

Above the discharging conveyor 16 and the regrouping conveyor 17 is provided another endless chain conveyor with push-bars 21 which is coupled to the first endless chain conveyor with push-bars 4. This second push-bar conveyor 21 is constituted by two parallel endless chains 22 transversely supporting the bars 21. The spacing between bars 21, which may be irregular, depends solely upon the number of loads to be regrouped to constitute the desired group. The chains 22 of this push-bar conveyor pass round two pairs of sprockets 23 and 24, the sprockets 23 being keyed to a shaft 25 and the sprockets 24 being keyed to the shaft 8a of the first distributing push-bar conveyor 4, as seen clearly in FIG. 2. The arrangement of the push-bar conveyor 21 about the push-bar conveyor 4 is such above the rollers 3 that each bar 21 of the lower side 22a of the chains 22 is located right below a bar 4 of the lower side 6a of the chains 6, as seen clearly in FIG. 1. In this manner, the penetration of the loads or objects 2 at the exit from the conveyor 13 takes place simultaneously into both push-bar conveyors, the speed of movement of which is identical.

There will be described hereafter in more detail the operation of the machine just described and more particularly that of the distributing device 1 which constitutes the essential element thereof.

As mentioned previously, the objects 2 conveyed in a line by the conveyors 12 and 11, are, owing to the selecting device 13, delivered one by one onto the roller conveyor 3, each object 2 being pushed by a bar 4 under which is possibly located a bar 21.

While being pushed (towards the right in the Figures) by the bars 4, the objects 2 are driven by the rollers 3 rotating in the direction of the arrow F (FIG. 3), towards the oblique guide 5, which retains them. Thus, as seen in FIG. 3, the object 2 pushed by the bar 4 assumes successively the positions 2a, 2b and 2c, and then the position 2d where the stop 9 intervenes to retain and translate the object in a direction parallel to the axes 3a of the rollers 3. Of course, the position of the stop 9 varies from one bar 4 to the other, as seen in FIG. 2, so as to ensure a transverse distribution of the objects 2 with respect to the direction of movement of the push bars 4. Furthermore, as seen in FIG. 4, an object 2 may be rotated and reoriented by a stop 10 described previously. Thus, as seen in FIG. 4, where the bars 4 are provided with a stop 9 and a stop 10, the latter rotates the object as seen at 2a, the reoriented object assuming successively the positions 2b and 2c along the oblique guide 5 to finally be taken over by the retaining and translating stop 9, as seen at 2d and 2e. Also in this case, it will be understood that any spacing or distance between the stops 9 and 10 of a bar may be selected depending on the distribution to be obtained. It will be pointed out here that the turning of the loads 2 is caused by the fact that they must pass round the stops 10 by rotating, the oblique guide 5 advantageously allowing possible uncontrolled rotations of the said loads during their transfer to be avoided. Indeed, the guide 5 permanently limits the rotation of the loads 2 and therefore maintains them in an angular deviation compatible with an easy reorientation thereof on their contacting the translating stops 9.

The loads 2 having been distributed as explained previously and in accordance with the desired pattern, which depends on the position of the stops 9 and 10 on the bars 4, the loads 2 leave the bars 4 and are discharged towards the conveyors 16 and 17, the bars 21 of the other push-bar conveyor then taking them over from the bars 4.

On passing onto the regouping conveyor 17, which moves at a reduced speed, the loads 2 abut one by one against the bar 21 which follows them and therefore accumulate there to form sets or batches of loads. At the end of the conveyor 17 for the slowing-down or longitudinal regrouping of the objects 2, the bars 21 then push the sets of loads 2 through the two lateral guides 18 so as to compel the said loads to regroup in the transverse direction to their exit from the conveyor 17. Then the discharging conveyor 19 discharges the sets of loads 2 grouped in a predetermined pattern, which sets of loads can then be conveyed successively onto for example a palletizer such as 20 so as to ensure the transfer of the objects re-grouped for example in successive layers.

There is shown in FIGS. 2 and 2a, by way of example, a group of objects resulting from the distribution effected by the roller conveyor 3 and the push-bar conveyor 4. This group of objects results, as seen clearly in these two Figures, from the juxtaposition of three sets of loads designated respectively at 30, 31 and 32 in the said Figures.

There is therefore obtained, according to the invention, a device for continuously distributing substantially parallelepipedic loads which is particularly reliable and flexible in use and allows any subsequent treatment of the loads thus distributed, such as for example a regrouping of such loads with a view to their transfer in groups of loads arranged in a predetermined manner.

It will also be added here that the intake conveyor 11, the selecting conveyor 13, the roller conveyor 3, the push-bar conveyors 4 and 21, the discharging conveyor 16, the slowing-down and regrouping conveyor 17 as well as the discharging conveyor 19 are driven continuously in a synchronized manner.

Of course the invention is by no means limited to the form of embodiment described and illustrated which has been given by way of example only.

Thus, there can quite suitably be provided at the exit from the roller and push-bar distributing conveyor 3-4 a means capable of acting on the previously distributed objects, without however departing from the scope of the invention.

The latter therefore comprises all technical equivalents to the means described as well as their combinations if the latter are carried out according to its gist and used within the scope of protection as claimed.

What is claimed is:

1. Conveyor apparatus for transporting objects in a predetermined line of travel and for selectively distributing said objects transversely with respect to the line of travel, the apparatus including an object-supporting surface having an entrance end, an exit end, and two side margins extending parallel to the line of travel, an endless flight bar conveyor extending parallel to the line of travel, the flight bar conveyor having a plurality of spaced bars extending transversely to the line of travel from one side margin to the other side margin of the object-supporting surface, and means for driving the flight bar conveyor for moving the flight bars above the object-supporting surface for contacting successive objects at the entrance end of the object-supporting surface and moving said objects on the supporting surface in the direction of the line of travel to the exit end of the supporting surface, wherein the improvement comprises:
    means for moving the object-supporting surface continuously from one side margin toward the other side margin in a direction transverse to the line of travel, thereby causing each object to slide laterally against the respective flight bar as the flight bar moves said object forward in the line of travel and
    an elongated stop member fixed to each flight bar at a predetermined lateral position between the side margins of the supporting surface, the stop member extending forwardly from the flight bar substantially parallel to the line of travel and having a length sufficient to stop further lateral movement of the object being conveyed.

2. A conveyor apparatus according to claim 1, the apparatus further comprising:
    means for delivering objects successively to a feed station at the entrance end of the object-supporting surface adjacent said one side margin and
    a stationary guiding element arranged above said object-supporting surface, said guiding element extending from a point at the entrance end of the object-supporting surface on the side of the feed station opposite said one side margin toward the other side margin near the exit end of the object-supporting surface, such that each object driven by the combined forward movement of a respective flight bar and the lateral movement of the object-supporting surface is forced to slide along said stationary guiding element in a path oblique to said line of travel until its lateral movement is stopped by the stop member of said flight bar.

3. A conveyor apparatus according to claim 1 the apparatus further comprising a catch member fixed to a corresponding flight bar at a lateral location closer to the one side margin than the stop member of said flight bar, said catch member extending forwardly from the flight bar for a distance sufficient to catch an object being moved by the flight bar, without stopping the lateral movement of the object, the catch member causing the object to turn so as to be reoriented from its orientation entering the feed station prior to reaching the stop member.

4. A conveyor apparatus according to claim 1 wherein said object-supporting surface is provided by an array of rollers, the axes of said rollers being substantially parallel to the line of travel.

5. A conveyor apparatus according to claim 4 wherein said rollers comprise a horizontal array, and the apparatus further comprises means for rotating said rollers so that upper surfaces of said rollers move continuously in a direction from the one side margin toward the other side margin.

6. A conveyor apparatus according to claim 1, the apparatus further comprising an in feed conveyor for delivering objects one at a time to an entrance station located at the entrance end of the object-supporting surface adjacent to the one side margin thereof.

7. A conveyor apparatus according to claim 1, the apparatus further comprising:
    at least one conveyor located downstream of the exit end of the object-supporting surface for discharging objects previously distributed;
    a conveyor located downstream of said at least one discharging conveyor for regrouping said objects in the longitudinal and transverse directions;
    an additional flight bar conveyor extending parallel to the direction of movement of said discharging and regrouping conveyors, said additional flight bar conveyor having a forward run of flight bars disposed above said discharging and regrouping conveyors; and
    means coupling the additional flight bar conveyor to the first-mentioned flight bar conveyor for movement at the same speed as said first-mentioned flight bar conveyor.

* * * * *